United States Patent [19]

Chawla

[11] Patent Number: 4,682,892
[45] Date of Patent: Jul. 28, 1987

[54] METHOD AND APPARATUS FOR SPECKLE-SHEARING INTERFEROMETRIC DEFORMATION ANALYSIS

[75] Inventor: Surendra K. Chawla, Akron, Ohio

[73] Assignee: The Goodyear Tire & Rubber Company, Akron, Ohio

[21] Appl. No.: 770,937

[22] Filed: Aug. 30, 1985

Related U.S. Application Data

[63] Continuation-in-part of Ser. No. 407,687, Aug. 13, 1982, abandoned.

[51] Int. Cl.$^4$ ................................................ G01B 9/02
[52] U.S. Cl. .................................. 356/353; 356/35.5; 356/347; 356/354
[58] Field of Search ....................... 356/35.5, 347, 348, 356/353, 354, 359, 360

[56] References Cited

U.S. PATENT DOCUMENTS 3,767,308 10/1973 Duffy .................................. 356/359
4,139,302 2/1979 Hung et al. ........................ 356/35.5

OTHER PUBLICATIONS

Chiange et al., "Whole Field Stress Analysis of a Centrally Cracked Tensile Plate by a Laser Speckle Method" *Topical Meeting on Hologram Interferometry and Speckle Metrology*, Jun. 2–4 1980, Cape Cod, Mass., pp. MA6-1–MA6-4.
Archbold et al., "Displacement Measurement from Double-Exposure Laser Photographs," *Optica Acta*. vol. 19, No. 4, pp. 253–271, 8/72.
Hung et al., "Measurement of Slopes of Structural Deflections by Specke-Shearing Interferometry" *Eaptl. Mech.*, pp. 281–285, 7/74.
Hung et al, "Speckle-Shearing Interferometric Technique: A Full Field Strain Gauge", *Applied Optics*, vol. 14, No. 3, pp. 618–622, 3/75.
Duffy, "Measurement of Surface Displacement Normal to the Line of Sight", *Eaptl. Mech.* pp. 378–384, 9/74.

Primary Examiner—Davis L. Willis
Assistant Examiner—Matthew W. Koren
Attorney, Agent, or Firm—L. R. Drayer; R. J. Slattery

[57] ABSTRACT

A nondestructive means of testing tires for subsurface defects by speckle-shearing interferometry. The tire is illuminated with a beam of coherent light. The light reflected from a surface of the tire is directed through a converging lens having one-half of one of its surfaces covered by a transparent plate having flat parallel sides such that a photographic media is exposed to a first pair of focused images of the tire displaced with respect to one another. The tire is then subjected to a stress, and a second pair of slightly displaced images is recorded on the same photographic media. The photographic media is developed to form a transparency, and then a first surface of the developed photographic media is illuminated with a collimated white light source. Interference fringes that are observed by viewing the opposite surface of the photographic media may then be analyzed.

10 Claims, 5 Drawing Figures

METHOD AND APPARATUS FOR SPECKLE-SHEARING INTERFEROMETRIC DEFORMATION ANALYSIS

This is a continuation-in-part of application Ser. No. 407,687 filed on Aug. 13, 1982 now abandoned.

BACKGROUND OF THE INVENTION

The present invention relates to a method and apparatus for using speckle-shearing interferometry to analyze the deformation of an object when a stress is applied to it. More specifically to locate subsurface defects in pneumatic tires such as voids, separations, or nonuniformities.

Nondestructive means of analyzing the deformation of an object when a stress is applied thereto are useful in quality control and engineering studies. As used herein, "deformation" refers to the displacement of points on the surface of an object relative to one another resulting from a stress imposed on the object, as opposed to overall, uniform displacements resulting from the stress.

There are several widely recognized ways of analyzing surface deformation including at least: point-by-point mapping of the object surface before and after the imposition of a stress; holographic interferometric techniques; birefringent-coating techniques; and speckle-shearing interferometric techniques. U.S. Pat. No. 4,139,302, issued to Hung et al, teaches a method and apparatus for analyzing the strain on an object resulting from the application of a stress employing speckle-shearing interferometric techniques. When a surface is illuminated by a source of coherent light, such as a laser, it has a grainy appearance which is known as speckle effect. This speckling, of light and dark points, is due to random interference of light reflectively scattered from different depths on the object's surface. These bright speckles are small regions where the light reflected from the object is of the same phase, giving the speckle its bright appearance from mutual reinforcement. As used herein, "shearing" refers to focusing light reflected from an object through an optical device to form two focused images of the object slightly displaced with respect to one another. By interfering two speckle-sheared patterns on a photographic media, corresponding to the undeformed and deformed states of the surface of an object, a fringe pattern is produced that contours the displacement gradient of the surface.

SUMMARY OF THE INVENTION

To produce an interferogram in accordance with the present invention, a beam of coherent light is directed toward a surface of the object that is to be analyzed, such as the interior surface of a pneumatic tire. When the light is reflected off of the surface of the object, which is not perfectly smooth, of course, some of the light rays reflected from various depths on the surface of the object will interfere with others. The net result will be a pattern of bright speckles surrounded by dark areas. The object's surface is photographed by directing the reflected light through an imaging lens, one-half of one surface of which is covered by a transparent plate having flat parallel sides to shear the image, such that a photographic media is exposed to the focused image that results. Actually, the focused image is comprised of two slightly offset images of the surface. This method and apparatus for shearing an image is in contrast to the use of a wedge-shaped prism covering a portion of a surface of a converging lens, as taught in U.S. Pat. No. 4,139,302. The wedge-shaped prism of U.S. Pat. No. 4,139,302 acts as an extension to the main lens. One-half of the lens being a double convex lens having a first focal length f1 and the other half of the lens acting with the wedge-shaped prism acts like a second double convex lens having a second focal length f2. The rays of light entering the wedge are bent and deviated in direction. The photographic media is located then at a distance corresponding to f1. Therefor the images from f2 are shifted and interfere with those of f1 because of the difference in focal length. In contrast, this invention provides for the lateral displacement of the direction of the light rays entering the plate. The emerging ray is therefor parallel to the incident ray and is not deviated in direction. The emerging rays are then passed through the double convex lens utilizing the entire lens and focusing both the light received from the plate and the non-deviated light onto the photographic media, thereby keeping a constant focal length. Next, a stress is applied to the object and a second pair of images is recorded on the same photographic media as the first pair, or in other words a double exposure is made. The resultant image is an interferogram comprising a complex grid and interference fringe pattern which is an indication of the strain produced by the stress applied to the object. A non-uniform strain results from nonuniformities, such as defects, within the object. This will be indicated by a fringe pattern similar to a bull's eye or a butterfly. The photographic media is then developed to form a transparency. One surface of the developed photographic media is then illuminated with white light that has been passed through a collimating lens, and the resultant image appearing on the opposite surface of the photographic media is either viewed or photographed from a vantage point that is offset from the central axis of the collimating lens. If viewed in this manner a clear and easily recognizable image of the deformation anomalies is observed. This method of analyzing the resultant image is in contrast to the use of a comparatively complicated device employing a fringe frequency filter to generate a Fourier plane projection of the resultant image as taught in U.S. Pat. No. 4,139,302. These filtering techniques result in a reduction in the intensity of the light causing the deformation anomalies to not appear or are so vague that it is difficult to interpret them.

Accordingly, one aspect of the present invention is a method of detecting defects within an object resulting from the application of a stress by forming a photographic image of an object containing interference fringes arrayed as a function of strains resulting from applying a stress to the object by illuminating the object with coherent light, focusing light reflected from the object onto a photographic media through the use of a converging lens adapted by a means for shearing the image to form two focused images of the object slightly displaced relative to one another so as to have an area of overlap which comprises a substantial portion of both focused images, applying said stress to the object, focusing light reflected from the object after the application of stress through said lens and means for shearing to form two more overlapping images of the object on said photographic media, developing said photographic media to form a transparency, and analyzing the resultant image of the object, the improvement is characterized by said means for shearing the image comprising said converging lens having one-half of one of its surfaces covered by a transparent plate having flat parallel sides.

There is provided in accordance with another aspect of the present invention a method of analyzing the strain on an object resulting from the application of a stress comprising the steps of: (a) illuminating the object with a coherent light source; (b) exposing a photographic media to a first pair of focused images of the object displaced with respect to one another derived by passing light reflected from the object through a converging lens having one-half of one of its surfaces covered by a transparent plate having flat parallel sides; (c) stressing the object; (d) exposing the photographic media to a second pair of focused images of the object, displaced with respect to one another like the first pair of images, after stressing; (e) developing the photographic media to form a transparency; and (f) illuminating a first surface of the developed photographic media with white light that has been passed through a collimating lens and then viewing the interference fringes of the resultant image of the object appearing on an opposite surface of said photographic media from a vantage point that is offset from the central axis of the collimating lens.

There is further provided in accordance with yet another aspect of the present invention an apparatus for generating an image of an object containing interference fringes arrayed as a function of the strain produced in the object by an applied stress, comprising: (a) a laser for generating a beam of coherent light to illuminate the object; (b) a camera including a converging lens having one-half of one of its surfaces covered by a transparent plate having flat parallel sides adapted to record a focused image of the object consisting of two images displaced with respect to one another so that a major portion of their areas overlap; and (c) a means for viewing an image of the object with interference fringes comprising a source of white light that has been passed through a collimating lens for illuminating a first surface of a developed photographic media, that was exposed in said camera to light reflected from said object, such that said interference fringes appear on an opposite surface of said photographic media.

Other aspects and advantages of the invention will become apparent from the following detailed description with reference being made to the accompanying drawings.

DESCRIPTION OF THE PREFERRED EMBODIMENT

Figure 1:
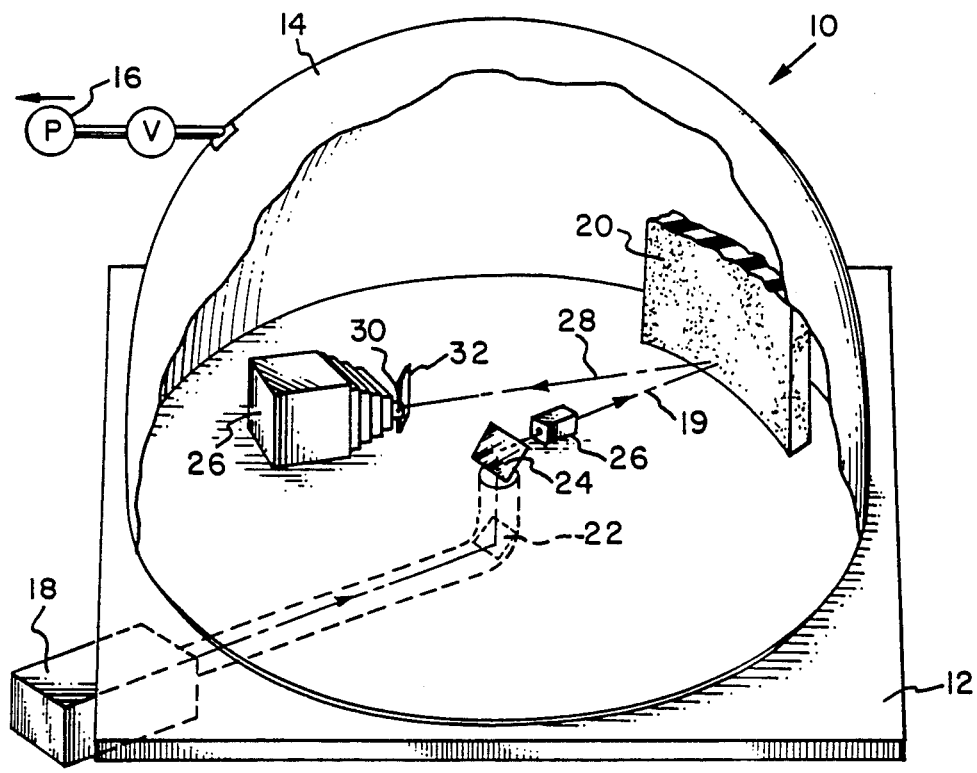
FIG. 1 is a pictorial cutaway view of an apparatus for forming an interferogram on a photographic media.
Figure 2:
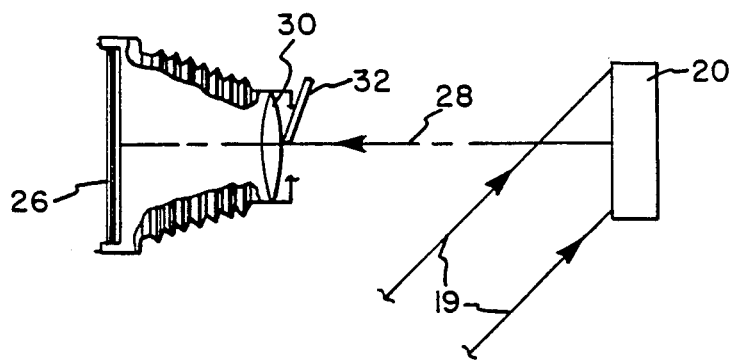
FIG. 2 is a schematic representation of the apparatus shown in FIG. 1.

Referring to FIGS. 1 and 2, there is illustrated an apparatus 10 for generating an image of an object containing interference fringes arrayed as a function of the strain produced in the object by an applied stress. The apparatus is shown mounted upon a flat surface 12, such as a table. Unlike holographic devices, no vibration isolation device is required for the mounting surface. A means for imparting a stress to the object being analyzed, such as an enclosure 14 and vacuum pump 16, is provided in accordance with the particular stress that the designer or operator desires to study. While a vacuum chamber was found to be very useful for analyzing defects in tires for vehicles, it will be apparent to those skilled in the art that devices for imparting tension, compression, torsion or vibration could be substituted for the vacuum chamber.

A laser 18 generates a beam of coherent light 19 to illuminate the object 20 that is to be studied and analyzed. The beam of coherent light may be directed, for example, by having the beam reflected off of the surfaces of a pair of mirrors 22,24 and allowing a predetermined portion of the beam to pass through a beam expander 27 towards a selected surface of the object 20. A beam expander may be, for example, a diffusing glass. However, any suitable means for directing a beam of coherent light upon a surface of an object may be employed without deviating from the spirit or scope of the invention, including the use of a pinhole filter in place of the diffusing glass.

In analyzing the strain on, or distortion of, an object resulting from the application of a stress according to the present invention, it is necessary to first record two focused images of the object on a photographic media 26 while the object has substantially no stress being applied to it. This first exposure is made by focusing light 28 reflected from the object 20 onto a photographic media 26 through the use of a converging lens 30 adapted by a means for shearing the image to form two focused images of the object slightly displaced relative to one another so as to have an area of overlap which comprises a substantial portion of both focused images. The present invention provides an improvement over the prior art by having a means for shearing the image comprising the converging lens 30 having substantially one-half of one of its surfaces covered by a transparent plate 32 having flat parallel sides. The converging lens may be the imaging lens of a 35 mm. or 70 mm. camera. The photographic media may be, for example, Kodak (T.M.) SO-253 high-speed holographic film. The transparent plate may be glass or another transparent material such as acrylic plastic. Shearing displacement of the images is a function of the thickness of the plate, refractive index of the plate material, and angular relationship of the flat sides of the plate to a line parallel to the surface of the photographic media. For example, a transparent plastic plate having flat parallel sides oriented at about 10 to 15 degrees with respect to a line parallel to the surface of the photographic media works satisfactorily. Preferably, one end of the transparent plate is in contact with a surface of the converging lens. The transparent plate 32 may be situated, as shown in FIGS. 1 and 2, between the object 20 and the converging lens 30 or between the converging lens and the photographic media 26 with equally satisfactory results. Thus, the shearing displacement of a portion of the light reflected from the object is accomplished by employing the widely recognized principle that a ray of light in passing through a parallel-sided slab and emerging into the original medium is displaced laterally but is not deviated in direction. This phenomenon is in contrast to the deviation in a light beam passing through a triangular, wedge-shaped prism, wherein the ray emerging back into the original medium is deviated to an extent depending upon well-recognized factors including the refractive index of the material and the angle of incidence of the light beam.

The first pair of images recorded on the photographic media comprise a pattern of bright speckles. The analysis of the object though requires that a second pair of images be formed on this same photographic media before it is developed, or in other words, that a double exposure be made. Before forming the second pair of images, the object has a stress applied to it. It has been found that a pneumatic tire may be studied by forming a partial vacuum in an enclosure containing the tire. Of course, any desired stress may be imparted to the object by any number of suitable devices. While the stress remains on the object, it is necessary to focus light reflect from the object after the application of the stress through the lens and means for shearing, described above, to form two more overlapping images of the object on the photographic media. After exposing the photographic media to a second pair of focused images of the object, displaced with respect to one another like the first pair of images, after stressing, the photographic media is developed to form a transparency.

Figure 3:
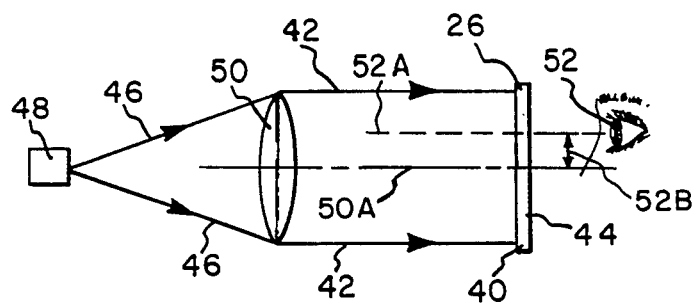
FIG. 3 is a schematic representation of an apparatus for analyzing an interferogram.

The method and apparatus for analyzing the resultant image of the object in a transparency may best be understood by referring to FIG. 3. A first surface 40 of the developed photographic media 26 is illuminated with collimated white light 42, so that the interference fringes of the resultant image of the object appearing on a second surface 44 of the developed photographic media, which is opposite the first surface, may be analyzed. The white light is collimated by allowing the light beam 46 from a source of white light 48 to pass through a collimating lens 50. The resultant image may be viewed with a naked eye 52, when viewed from a vantage point 52A which is offset 52B from the central axis 50A of the collimating lens 50. A camera (not shown) may be used to make a permanent record of the interference fringes that appear on the second side of the developed photographic media if it is also offset from the central axis 50A. The resultant image may also be viewed by using a television camera to transmit the image to a television monitor.

Figure 4:
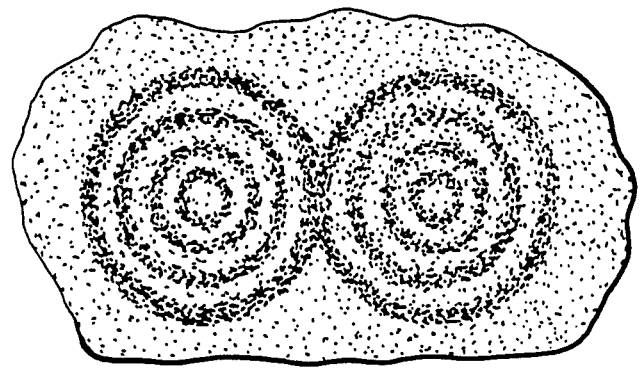
FIG. 4 is a pictorial representation of an interferogram.

FIG. 4 shows a representative interference pattern that may be observed when an interferogram is produced and analyzed using the method and apparatus described herein. This type of interference pattern is referred to as a "butterfly" pattern, and is the contour of the slope of deflection of the surface of the object. A butterfly pattern appears in the interferogram shown in FIG. 4, and indicates a region of the object's surface that has been deformed by the applied stress more than adjacent areas of the object's surface. The exact interpretation of a butterfly interference pattern depends of course upon the nature of the object being analyzed. For example, the appearance of a butterfly pattern in an interferogram of the interior surface of a pneumatic tire may indicate a failure of the plies of the tire to adhere to one another.

Figure 5:
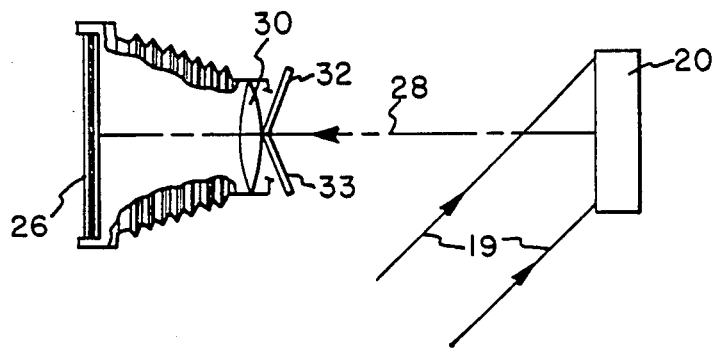
FIG. 5 is a schematic representation of an alternate embodiment of the apparatus shown in FIGS. 1 and 2.

Referring now to FIG. 5, there is shown an alternative embodiment of the apparatus shown in FIGS. 1 and 2. This alternative embodiment is substantially the same as the apparatus already described herein, except that the converging lens 30 of the camera has the other one-half of one of its surfaces covered by another transparent plate 33 having flat parallel sides. In other words, the converging lens has a first half of one of its surfaces covered by a first transparent plate 32 having flat parallel sides, and a second half of one of its surfaces covered by a second transparent plate 33 having flat parallel sides. The sides of each of the transparent plates are symmetrically inclined with respect to the axis of the lens. It is believed that each transparent plate should be inclined at an angle of between about 5 to 10 degrees, preferably about 5 degrees, with respect to a line parallel to the surface of the photographic media. It is believed that a method of analyzing the strain on an object using this embodiment may yield a sharper image than the embodiment using only one transparent plate as described in the foregoing text. The shearing of the image in this alternate embodiment involves one transparent plate shifting light rays reflected from the object in a first direction while the second transparent plate shifts light rays reflected from the object in the opposite direction.

While certain representative embodiments and details have been shown for the purpose of illustrating the invention, it will be apparent to those skilled in the art that various changes and modifications may be made therein without departing from the spirit or scope of the invention.

I claim:

1. An apparatus for generating an interferogram for detection of subsurface voids, separations and nonuniformities of pneumatic tires comprising:
    (a) a means for generating a beam of coherent light to illuminate and reflect light off of said pneumatic tire;
    (b) a camera, including a photographic media and a converging lens comprising a double convex lens having one-half of one of its surfaces covered by a transparent plate having flat parallel sides oriented at a predetermined angular inclination with respect to an axis of the lens and an end contacting the surface of the double convex lens at its mid-point, said transparent plate adapted to displace laterally some of the light reflected from the pneumatic tire, and the converging lens adapted to receive light and focus it onto the photographic media to expose and record a focused image of interference fringes formed from two images of said tire, displaced with respect to one another and having a major portion of their areas overlapping; and
    (c) a means for viewing the focused image of the pneumatic tire with interference fringes comprising a white light adapted to pass through a collimating lens for illuminating a first surface of the developed photographic media, that was exposed in said camera, such that said interference fringes appear on an opposite surface of said photographic media when viewed from a vantage point that is offset from the central axis of the collimating lens.

2. The apparatus as set forth in claim 1 further comprising a means for applying a stress to the pneumatic tire.

3. The apparatus as set forth in claim 2 further comprising a second transparent plate having flat parallel sides covering the other one-half of one of the surfaces of the double convex lens the sides of each transparent plate being oriented symmetrically at a predetermined angular inclination with respect to the axis of the lens, and each having one end in contact with said surface of the double convex lens at its midpoint.

4. The apparatus as set forth in claim 3 wherein the means for applying a stress comprises an enclosure surrounding the pneumatic tire and a vacuum pump.

5. An apparatus as set forth in claim 4 wherein the means for viewing an image further comprises a camera disposed at said vantage point for making a permanent record of the interference fringes that appear on the second side of said photographic media.

6. An apparatus as set forth in claim 5 wherein the means for viewing an image further comprises a television camera disposed at said vantage point and television monitor.

7. The apparatus of claim 5 wherein both plates are plastic and the angular inclination of both is between 5 to 10 degrees.

8. The apparatus as set forth in claim 2 wherein said plate is plastic and the angular inclination is between 10 to 15 degrees.

9. A method of detecting subsurface voids, separation and nonuniformities of a pneumatic tire comprising the steps of:
   (a) providing an illuminated and unstressed pneumatic tire, said illumination being a coherent laser light source;
   (b) exposing a photographic media to a first pair of focused images of the tire displaced with respect to one another and having a major portion of their areas overlapping, derived by passing light reflected from the object through a converging lens comprising a double convex lens having one-half of one of its surfaces covered by a transparent plate having flat parallel sides oriented at a predetermined angular inclination with respect to an axis of the lens and having one end which is in contact with said surface of the double convex lens;
   (c) illuminating said tire in a stressed condition;
   (d) exposing the photographic media to a second pair of focused images of the object, displaced with respect to one another like the first pair of images, during stressing:
   (e) developing the photographic media to form a transparency; and
   (f) illuminating a first surface of the developed photographic media with white light that has been passed through a collimating lens and then viewing the interference fringes of the resultant image of the tire appearing on an opposite surface of said photographic media from a vantage point that is offset from the central axis of the collimating lens.

10. The method of claim 9 wherein said double convex lens has the other one-half of one of its surfaces covered by another transparent plate having flat parallel sides, the sides of each transparent plate being oriented symmetrically at a predetermined angular inclination with respect to the axis of the lens and each having one end in contact with said surface of the double convex lens at its midpoint.

* * * * *